US009217353B2

(12) United States Patent
Naga et al.

(10) Patent No.: US 9,217,353 B2
(45) Date of Patent: Dec. 22, 2015

(54) MIXER FOR FLUID INJECTION SYSTEM

(71) Applicant: Caterpillar Inc., Peoria, IL (US)

(72) Inventors: Satya Ramakrishna Manda Venkata Naga, Dunlap, IL (US); Abhinash Reddy Konatham, Peoria, IL (US); Jayaraman K. Venkataraghavan, Dunlap, IL (US); Yongxiang Li, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 150 days.

(21) Appl. No.: 13/856,138

(22) Filed: Apr. 3, 2013

(65) Prior Publication Data

US 2014/0298781 A1    Oct. 9, 2014

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/28* | (2006.01) |
| *F01N 13/00* | (2010.01) |
| *B01F 5/02* | (2006.01) |
| *B01F 5/04* | (2006.01) |

(Continued)

(52) U.S. Cl.
CPC .......... *F01N 3/2892* (2013.01); *B01F 3/04049* (2013.01); *B01F 5/0268* (2013.01); *B01F 5/0473* (2013.01); *B01F 5/0618* (2013.01); *F01N 3/106* (2013.01); *F01N 3/2066* (2013.01); *F01N 13/009* (2014.06); *F01N 2610/02* (2013.01); *F01N 2610/1453* (2013.01); *Y02T 10/24* (2013.01)

(58) Field of Classification Search
USPC ...................... 60/317, 323, 324; 366/337, 340
See application file for complete search history.

(56) References Cited

U.S. PATENT DOCUMENTS

| | | | |
|---|---|---|---|
| 6,601,385 B2 | 8/2003 | Verdegan et al. |
| 7,467,749 B2 | 12/2008 | Tarabulski et al. |
| 8,141,353 B2 | 3/2012 | Zheng et al. |

(Continued)

FOREIGN PATENT DOCUMENTS

DE    10 2006 055 655    5/2008

OTHER PUBLICATIONS http://www.tenneco.com/original_equipment/emission_control/products_and_technologies, © Copyright 2011, Tenneco Inc. (printed on Mar. 27, 2013).

(Continued)

*Primary Examiner* — Kenneth Bomberg
*Assistant Examiner* — Dapinder Singh
(74) *Attorney, Agent, or Firm* — Finnegan, Henderson, Farabow, Garrett & Dunner, LLP (57) ABSTRACT

A mixer is disclosed for use in a fluid injection system. The mixer may have an impingement floor oriented generally perpendicular to an intended fluid injection direction and generally parallel with a flow direction. The mixer may also have a first side wall connected along a lengthwise edge of the impingement floor and generally parallel with the flow direction, and a second side wall connected along an opposing lengthwise edge of the impingement floor and generally parallel with the flow direction. The mixer may further have at least one shelf extending between the first and second side walls and generally parallel with the flow direction. The at least one shelf may have a plurality of vanes protruding toward and away from the impingement floor that promotes mixing of an injected fluid.

20 Claims, 4 Drawing Sheets

(51) Int. Cl.
*B01F 5/06* (2006.01)
*B01F 3/04* (2006.01)

(56) References Cited

U.S. PATENT DOCUMENTS

| | | | |
|---|---|---|---|
| 8,250,859 B2 | 8/2012 | Torisaka et al. | |
| 2002/0162322 A1 | 11/2002 | Ganzmann et al. | |
| 2005/0229590 A1* | 10/2005 | Bruck et al. | 60/286 |
| 2011/0113764 A1 | 5/2011 | Salanta et al. | |
| 2011/0146254 A1* | 6/2011 | Yi et al. | 60/310 |
| 2012/0189521 A1 | 7/2012 | Shijo et al. | |
| 2013/0170973 A1* | 7/2013 | Staskowiak et al. | 415/208.1 |

OTHER PUBLICATIONS http://www.gillet.com/en/scr_technology (printed on Mar. 27, 2013).

* cited by examiner

MIXER FOR FLUID INJECTION SYSTEM

TECHNICAL FIELD

The present disclosure relates generally to a mixer and, more particularly, to a mixer for a fluid injection system.

BACKGROUND

Internal combustion engines, including diesel engines, gasoline engines, gaseous fuel-powered engines, and other engines known in the art exhaust a complex mixture of air pollutants. These air pollutants can include, among other things, gaseous compounds such as the oxides of nitrogen ($NO_x$). Due to increased awareness of the environment, exhaust emission standards have become more stringent, and the amount of $NO_x$ emitted from an engine may be regulated depending on the type of engine, size of engine, and/or class of engine. In order to ensure compliance with the regulation of these compounds, some engine manufacturers have implemented a process called Selective Catalytic Reduction (SCR).

SCR is a process where a reductant (most commonly a urea/water solution) is injected into the exhaust gas stream of an engine and adsorbed onto a catalyst. The reductant reacts with $NO_x$ in the exhaust gas to form water ($H_2O$) and elemental nitrogen ($N_2$). Although SCR can be effective, when the reductant is sprayed onto relatively cool walls of the exhaust system it can condense. This condensation can create deposits that foul the injectors and cause premature wear and failure of the injection system. In addition, the condensed reductant may no longer be useful in reducing regulated emissions.

An exemplary reductant mixer is disclosed in U.S. Pat. No. 8,141,353 of Zheng et al. that issued on Mar. 27, 2012 ("the '353 patent"). Specifically, the '353 patent describes a system for treating exhaust gas by introducing an additive into the exhaust gas upstream from a catalyst. The system includes a mixer disposed between an additive injector and the catalyst. The mixer comprises a disc shaped wall structure having a plurality of perforated flow openings, and a cone shaped wall structure carrying a set of trapezoidal shaped mixer vanes that extend outward and intersect the disc shaped wall structure. The mixer vanes are formed by cutting a periphery of each vane to form an opening. The vane is then bent away from an upstream side of the mixer towards a downstream side of the mixer. An annular flange of the cone shaped wall structure engages an inner wall surface of an exhaust duct. The flow openings and mixer vanes together generate swirl in the exhaust that enhances mixing of injected additive with the exhaust.

While the mixer of the '353 patent may improve additive mixing, the mixer may still be less than optimal. In particular, the mixer of the '353 patent, because of its location downstream of the injector, does not inhibit the additive from being injected against a cool wall of the exhaust duct. In addition, the annular flange of the mixer may create an obstruction on which the injected additive can deposit. The swirl generated in the exhaust by the mixer may also be insufficient to adequately mix the exhaust. Further, the mixer may be intended for use with only a single additive injector and may not be applicable to systems having multiple injectors.

The present disclosure is directed at overcoming one or more of the shortcomings set forth above and/or other problems of the prior art.

SUMMARY

In one aspect, the present disclosure is directed to mixer. The mixer may include an impingement floor oriented generally perpendicular to an intended fluid injection direction and generally parallel with a flow direction. The mixer may also include a first side wall connected along a lengthwise edge of the impingement floor and generally parallel with the flow direction, and a second side wall connected along an opposing lengthwise edge of the impingement floor and generally parallel with the flow direction. The mixer may further include at least one shelf extending between the first and second side walls and generally parallel with the flow direction. The at least one shelf may have a plurality of vanes protruding toward and away from the impingement floor that promote mixing of an injected fluid.

In another aspect, the present disclosure is directed to another mixer. This mixer may include a cylindrical tube, a generally flat impingement floor fixedly connected inside the cylindrical tube, a generally flat first side wall connected along a lengthwise edge of the impingement floor at an obtuse interior angle, and a generally flat second side wall connected along an opposing lengthwise edge of the impingement floor at an obtuse interior angle. The mixer may also include a plurality of shelves extending between the first and second side walls. Each of the plurality of shelves may have a generally inverted V-shape and a plurality of vanes. The mixer may further include a central divider located about midway between the first and second side walls and passing through a vertex portion of the plurality of shelves. The central divider may include a plurality of diverging fins formed at a trailing edge that protrude in opposing directions toward the first and second side walls.

DETAILED DESCRIPTION

Figure 1:
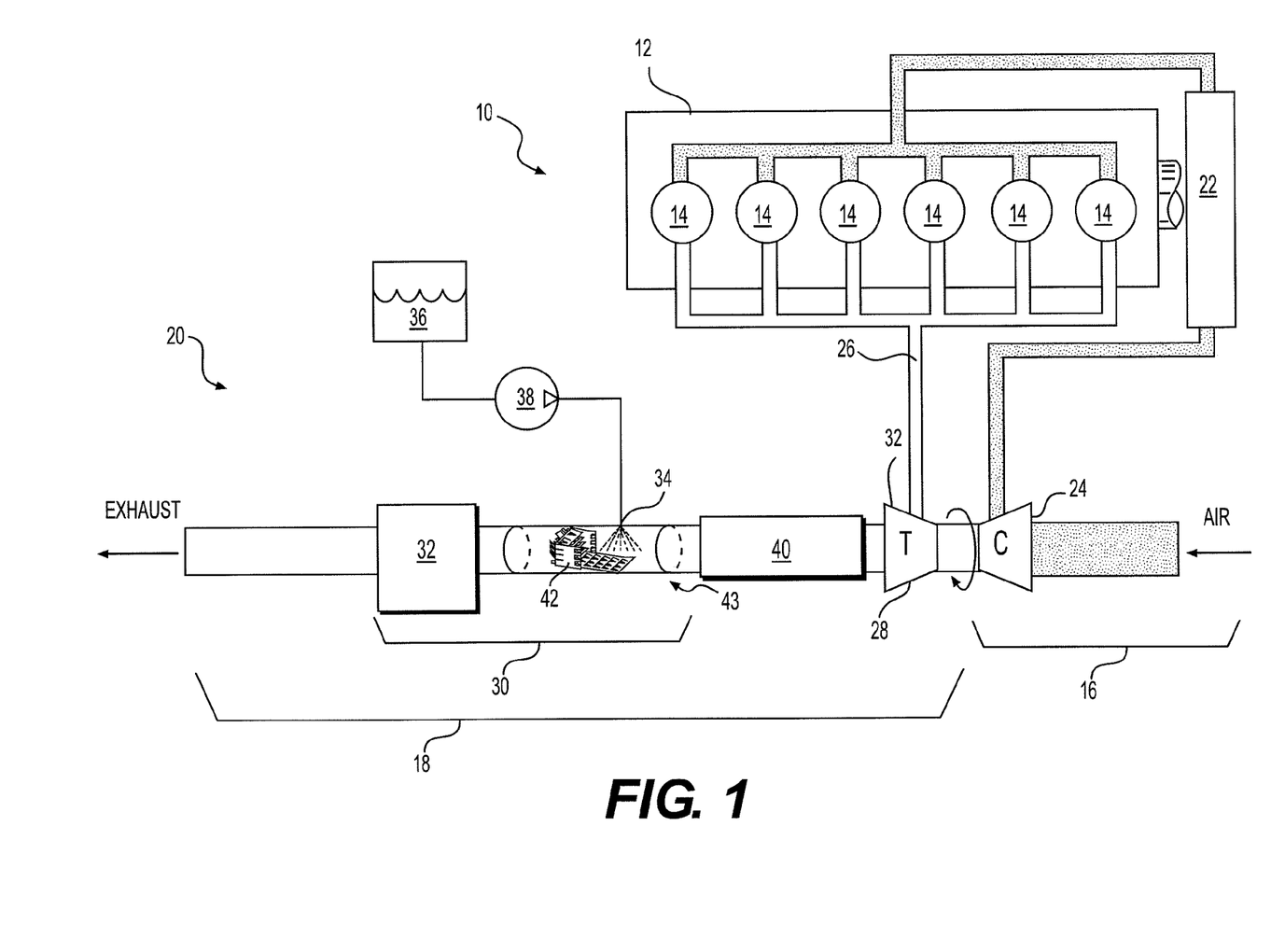
FIG. 1 is a diagrammatic illustration of an engine having an exemplary fluid injection system.

FIG. 1 illustrates an exemplary engine 10. For the purposes of this disclosure, engine 10 is depicted and described as a diesel-fueled, internal combustion engine. However, it is contemplated that engine 10 may embody any other type of combustion engine such as, for example, a gasoline or a gaseous fuel-powered engine burning compressed or liquefied nature gas, propane, or methane. Engine 10 may include an engine block 12 at least partially defining a plurality of cylinders 14, and a plurality of piston assemblies (not shown) disposed within cylinders 14 to form a plurality of combustion chambers (not shown). It is contemplated that engine 10 may include any number of combustion chambers and that the combustion chambers may be disposed in an in-line configuration, in a "V" configuration, in an opposing-piston configuration, or in any other conventional configuration.

Multiple separate sub-systems may be associated within engine 10 and cooperate to facilitate the production of power. For example, engine 10 may include an air induction system 16, an exhaust system 18, and an aftertreatment system 20. Air induction system 16 may be configured to direct air or an air and fuel mixture into engine 10 for subsequent combustion. Exhaust system 18 may exhaust byproducts of combustion to the atmosphere. Aftertreatment system 20 may function to reduce the discharge of regulated constituents by engine 10 to the atmosphere.

Air induction system 16 may include multiple components configured to condition and introduce compressed air into cylinders 14. For example, air induction system 16 may include an air cooler 22 located downstream of one or more compressors 24. Compressors 24 may be connected to pressurize inlet air directed through cooler 22. It is contemplated that air induction system 16 may include different or additional components than described above such as, for example, a throttle valve, variable valve actuators associated with each cylinder 14, filtering components, compressor bypass components, and other known components that may be selectively controlled to affect an air-to-fuel ratio of engine 10, if desired. It is further contemplated that compressor 24 and/or cooler 22 may be omitted, if a naturally aspirated engine is desired.

Exhaust system 18 may include multiple components that condition and direct exhaust from cylinders 14 to the atmosphere. For example, exhaust system 18 may include an exhaust passage 26 and one or more turbines 28 driven by exhaust flowing through passage 26. It is contemplated that exhaust system 18 may include different or additional components than described above such as, for example, bypass components, an exhaust compression or restriction brake, an attenuation device, and other known components, if desired.

Turbine 28 may be located to receive exhaust leaving engine 10, and may be connected to one or more compressors 24 of air induction system 16 by way of a common shaft to form a turbocharger. As the hot exhaust gases exiting engine 10 move through turbine 28 and expand against vanes (not shown) thereof, turbine 28 may rotate and drive the connected compressor 24 to pressurize inlet air.

Aftertreatment system 20 may include components configured to trap, catalyze, reduce, or otherwise remove regulated constituents from the exhaust flow of engine 10 prior to discharge to the atmosphere. For example, aftertreatment system 20 may include a reduction device 30 fluidly connected downstream of turbine 28.

Reduction device 30 may receive exhaust from turbine 28 and reduce particular constituents of the exhaust. In one example, reduction device 30 is a Selective Catalytic Reduction (SCR) device having one or more serially-arranged catalyst substrates 32 located downstream from a reductant injector 34. A gaseous or liquid reductant, most commonly urea ($(NH_2)_2CO$), a water/urea mixture, a hydrocarbon such as diesel fuel, or ammonia gas ($NH_3$), may be sprayed or otherwise advanced into the exhaust within passage 26 at a location upstream of catalyst substrate(s) 32 by reductant injector 34. This process of injecting reductant upstream of catalyst substrate 32 may be known as dosing catalyst substrate(s) 32. To facilitate dosing of catalyst substrate(s) 32 by reductant injector 34, an onboard supply 36 of reductant and a pressurizing device 38 may be associated with reductant injector 34. The reductant sprayed into passage 26 may flow downstream with the exhaust from engine 10 and be adsorbed onto the surface of catalyst substrate(s) 32, where the reductant may react with $NO_x$ (NO and $NO_2$) in the exhaust gas to form water ($H_2O$) and elemental nitrogen ($N_2$). This reduction process performed by reduction device 30 may be most effective when a concentration of NO to $NO_2$ supplied to reduction device 30 is about 1:1.

To help provide the correct concentration of NO to $NO_2$, an oxidation catalyst 40 may be located upstream of reduction device 30, in some embodiments. Oxidation catalyst 40 may be, for example, a diesel oxidation catalyst (DOC). As a DOC, oxidation catalyst 40 may include a porous ceramic honeycomb structure or a metal mesh substrate coated with a material, for example a precious metal, which catalyzes a chemical reaction to alter the composition of the exhaust. For instance, oxidation catalyst 40 may include a washcoat of palladium, platinum, vanadium, or a mixture thereof that facilitates the conversion of NO to $NO_2$.

In one embodiment, oxidation catalyst 40 may also perform particulate trapping functions. That is, oxidation catalyst 40 may be a catalyzed particulate trap such as a continuously regeneration particulate trap or a catalyzed continuously regenerating particulate trap. A particulate trap is a filter designed to trap or collect particulate matter.

In order for the injected reductant to be most effective, it should be thoroughly mixed with the exhaust gas before reaching catalyst substrate(s) 32, such that the reductant is evenly spread across a face of each catalyst substrate 32 and all exhaust passing through catalyst substrate(s) 32 comes into contact with the injected reductant. For this purpose, a mixer 42 may be disposed within exhaust passage 26, at the location of reductant injector 34.

Figure 2:
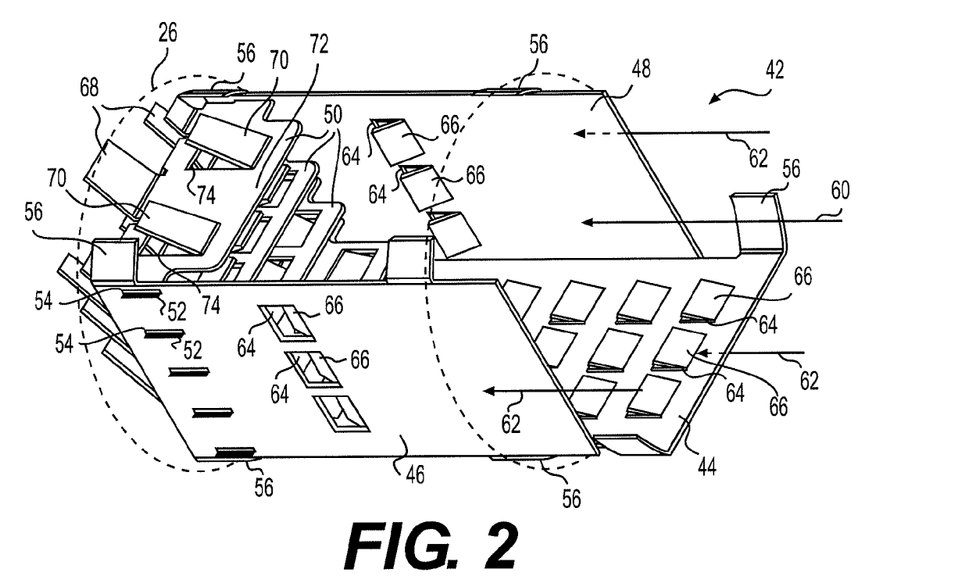
FIGS. 2 and 3 are isometric illustrations of an exemplary disclosed mixer that may be used with the fluid injection system of FIG. 1.
Figure 3:
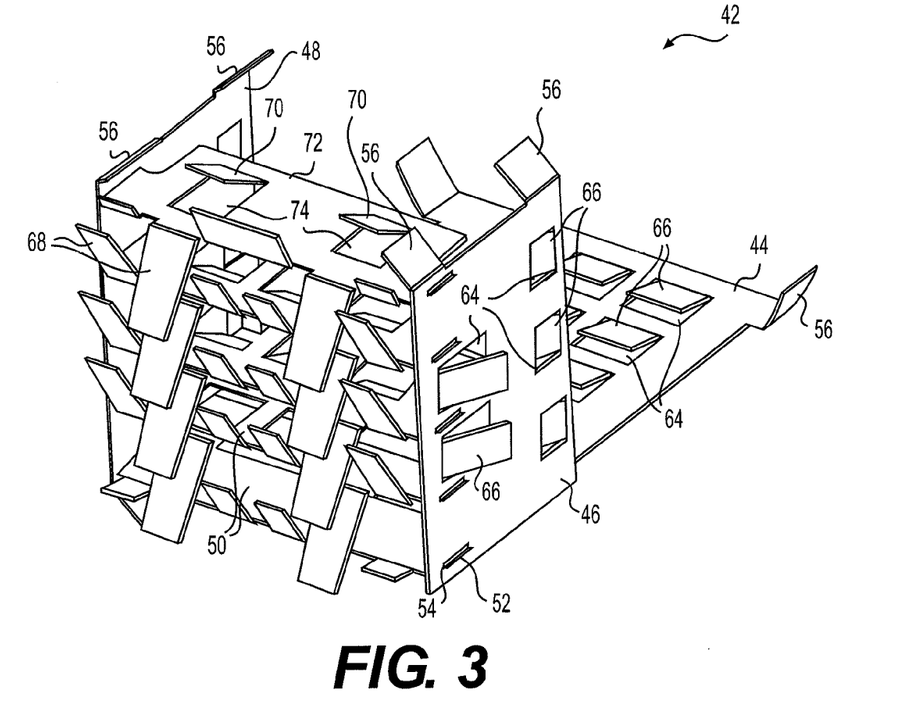

As shown in FIGS. 2 and 3, mixer 42 may be an assembly of multiple different components. In particular, mixer 42 may include an impingement floor 44 located opposite reductant injector 34 (referring to FIG. 1) within exhaust passage 26, a first side wall 46 connected along one lengthwise edge of impingement floor 44, a second side wall 48 connected along an opposing lengthwise edge of impingement floor 44, and a plurality of shelves 50 connected transversely between first and second side walls 46, 48. Impingement floor 44, first side wall 46, and second side wall 48 may generally form a three-sided enclosure configured to receive direct injections of reductant at a leading end, upstream of shelves 50.

Impingement floor 44, first side wall 46, and second side wall 48 may each be generally flat plate-like components that are welded to each other along their intersections in a generally orthogonal configuration. Shelves 50 may each include one or more end-located tabs 52 that engage and are welded to corresponding slots 54 within first and second side walls 46, 48. Shelves 50 may be generally parallel with impingement floor 44 and a gas flow direction through mixer 42, and spaced apart from each other in the injection direction. Each of impingement floor 44, first side wall 46, and second side wall 48 may similarly include at least one tab 56 configured to engage and be welded to a cylindrical inner surface of exhaust passage 26. Accordingly, mixer 42 and a portion of exhaust passage 26 (e.g., a cylindrical tubular segment of passage 26) may be formed into an integral component also known as a mixing module 43 (see FIG. 1).

The location and planar geometry of impingement floor 44, first side wall 46, and second side wall 48, relative to the cylindrical geometry of exhaust passage 26, may form a central flow path 60 and a plurality of separated peripheral flow paths 62. And because of the location of mixer 42 relative to reductant injector 34, the reductant injected by injector 34 may flow into mixer 42 via central flow path 60, but be blocked from peripheral flow paths 62 by impingement floor 44, first side wall 46, and second side wall 48. This may help to inhibit the injected reductant from splashing against the relatively cooler interior surface of exhaust passage 26 and depositing thereon. In addition, because impingement floor 44, first side wall 46, and second side wall 48 may be held away from the inner surface of exhaust passage 26 by tabs 56, these components may not form obstructions at the inner surface that tend to accumulate reductant.

Impingement floor 44 may be an elongated component that extends further upstream away from shelves 50 than first and second side walls 46, 48. In the embodiment of FIG. 2, impingement floor 44 may extend about 25% further than first and second side walls 46, 48. In the embodiment of FIG. 3, however, impingement floor 44 may extend about twice as far as first and second side walls 46, 48. These extensions may help to ensure that the reductant is not injected completely across exhaust passage 26 and onto the opposing cylindrical surface of exhaust passage 26. The different lengths of the extensions may be intended to accommodate different injection spray patters and sizes found in different applications. Because of the locations and orientations of first and second side walls 46, 48 (i.e., because these walls may not be in the direct injection path of the reductant), they may not need to be as long as impingement floor 44 and their shorter lengths may help to reduce a cost and weight of mixer 42. In addition, the absence of first and second side walls 46, 48 (and the associated increase in flow area) at the injection location, may help to slow a velocity of exhaust gas passing through this vicinity. The slower velocity may allow for greater injection penetration and subsequent mixing.

Each of impingement floor 44, first side wall 46, and second side wall 48 may include a plurality of openings 64 fluidly connecting peripheral flow paths 62 with central passage 60, and a converging fin 66 associated with each opening 64. Converging fins 66 may take a variety of forms, but all generally function to enhance or divert flow inward toward a center of flow path 60. In one example (see FIG. 2), converging fins 66 may be connected at a leading end of each opening 64 and extend inward into central flow path 60 at a trailing end to enhance inward flow. In another example (see FIG. 3), converging fins 66 may be connected at the trailing end and extend outward into peripheral flow path 62 at the leading end to divert the flow inward. In either configuration, exhaust may travel from peripheral flow paths 62 through openings 64 and into central flow path 60. And converging fins 66 may function to keep injected reductant away from the internal cylindrical walls of exhaust passage 26.

Shelves 50 may each include a plurality of vanes 68 and a plurality of mixing fins 70. In particular, shelves 50 may each be a flat generally plate-like component mounted at a trailing end of mixer 42, and include vanes 68 extending from a trailing edge thereof. Vanes 68 may be angled relative to the flow direction of gas through mixer 42 to interrupt and restrict, and thereby increase a velocity of, the exhaust flow. For example, vanes 68 may be angled at about ±40-50° (e.g., about ±45°) relative to the flow direction of exhaust gas in passage 26. A greater angle may increase flow restrictions too much, while a lesser angle may reduce mixing. In one embodiment, vanes 68 may extend alternatingly toward impingement floor 44 and away from impingement floor 44 across the trailing edge of shelves 50. In particular, the outermost vanes 68 and one or more center vanes 68 of each shelf 50 may extend upward toward injector 34 (i.e., away from impingement floor 44), while vanes 68 located between the outermost and center vanes 68 may extend downward toward impingement floor 44. In addition, vanes 68 of one shelf 50 may overlap somewhat with vanes 68 of an immediately adjacent shelf. This configuration may result in a turbulent (i.e., non-swirling, non-laminar, and non-recirculating) mixing of the reductant with exhaust gas. In addition, vanes 68 may form impingement surfaces for the injected reductant, causing collisions that function to break up reductant molecules.

In contrast to vanes 68, mixing fins 70 may be located within a face 72 of shelves 50, at a leading end of associated openings 74. In general, there may be fewer mixing fins 70 than vanes 68 within a given shelf 50, and mixing fins 70 may be angled less steeply. An exemplary shelf 50 may have two mixing fins 70 and five vanes 68, with mixing fins 70 angled at about ±20-30° (e.g., about ±25°) relative to the exhaust flow direction through mixer 42. Mixing fins 70 of adjacent shelves 50 may extend in different directions, if desired, while vanes 68 of all shelves 50 may extend in the same general directions. For example, a first or outer most shelf 50 may have mixing fins 70 that extend away from impingement floor 44, while an immediately adjacent shelf 50 may have mixing fins 70 that extend toward impingement floor 44. In general, mixer 42 may include two types of substantially identical shelves 50 and mixer 42 may be generally symmetrical about an axial center. This geometry may help reduce part count and fabrication costs of mixer 42. It is contemplated, however, that mixer 42 could include any number of different shelves 50 and/or that mixer 42 may be asymmetrical, if desired.

In the disclosed embodiment, all components of mixer 42 may be separately fabricated from flat stainless steel sheet stock through a stamping procedure. Specifically, the outlines of each component and each feature of each component may be stamped, and then the separate features bent and the components welded together, as required. It is contemplated, however, that one more of the components described above could alternatively be integral components, if desired, and formed through a bending process. For example, impingement floor 44, first side wall 46, and/or second side wall 48, could be bent at their intersections and formed from a single piece of sheet stock, if desired.

Figure 4:
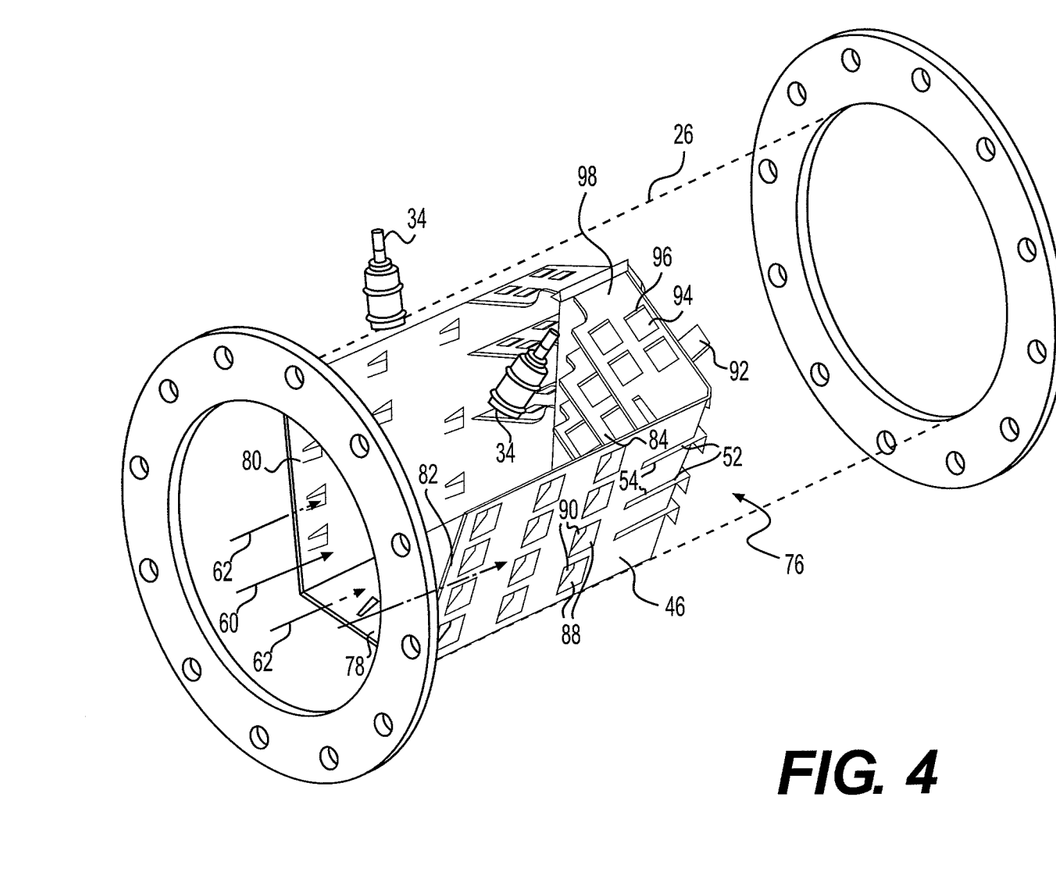
FIGS. 4 and 5 are isometric illustrations of an alternative exemplary disclosed mixer that may be used with the fluid injection system of FIG. 1.
Figure 5:
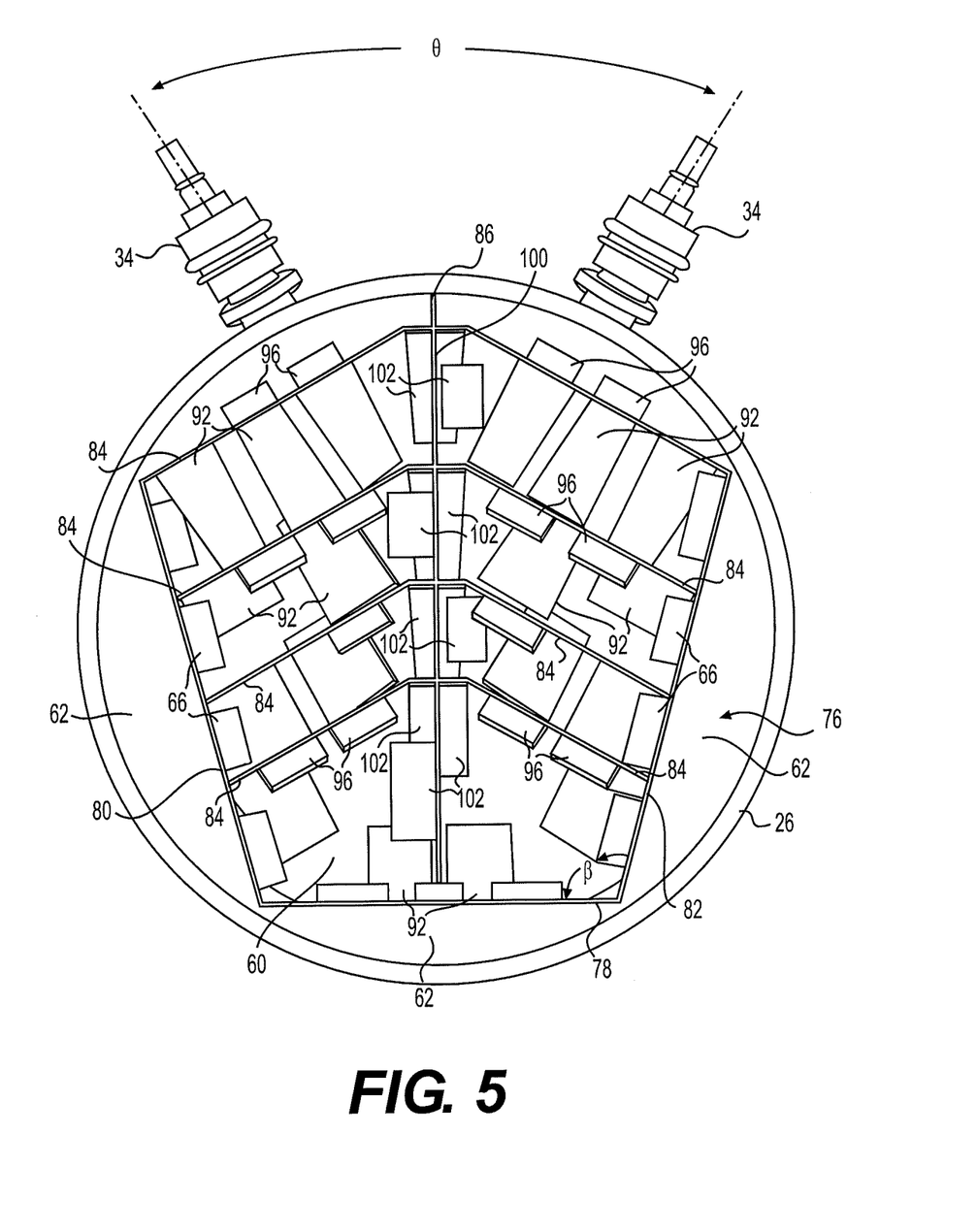

FIGS. 4 and 5 illustrate an alternative mixer 76 that is configured to simultaneously accommodate two reductant injectors 34. Specifically, two or more reductant injectors 34 could be included within reductant device 30, located at about the same axial position, and angled apart radially within passage 26 by an angle θ (see FIG. 1). For example, reductant injectors 34 could be angled apart by about 70-90°. In order to accommodate the spray patterns produced by multiple reductant injectors 34 and to adequately mix the correspondingly increased amounts of injected reductant, mixer 76 of FIGS. 4 and 5 may have geometry different than mixer 42 of FIGS. 2 and 3.

Like mixer 42, mixer 76 may include an impingement floor 78, a first side wall 80, a second side wall 82, and shelves 84. In addition, impingement floor 80, first side wall 82, and second side wall 84 may include openings 88, and converging fins 90. Shelves 84 may include vanes 92, openings 94, and mixing fins 96. However, in contrast to mixer 42, first and second side walls 80, 82 may not be orthogonal to impingement floor 78. Instead, first and second side walls 80, 82 may be angled outward away from impingement floor 78, such that an obtuse interior angle β (see FIG. 5) is formed. This configuration may increase an interior volume of mixer 76 that accommodates an increased reductant injection and/or injections having different shapes (e.g., wider spray patterns).

In addition, shelves 84 may no longer be plate-like. Instead, shelves 84 may have an inverted, generally V-shape, wherein a vertex 86 of each shelf 50 is located away from impingement floor 78. In this configuration, a face 98 of each shelf 84 may be generally perpendicular relative to an injection direction of a closest one of reductant injectors 34. This arrangement, combined with the flow direction of exhaust through passage 26 may facilitate efficient mixing of reductant with exhaust. It is contemplated that, instead of each shelf 84 having a single piece inverted V-shape, two different shelf pieces may alternatively be connected between first and second side walls 80, 82 at each shelf 84, and angled relative to each other to form the inverted V-shape, if desired.

Further, a central divider 100 may be included within mixer 76 that helps to center exhaust flow through left and right halves of mixer 76. In particular, central divider 100 may extend generally perpendicularly away from impingement floor 78 and pass through vertices 86 of shelves 84. A plurality of diverging fins 102 may extend from central divider 100 toward each of first and second side walls 80, 82. For example, one diverging fin 102 may extend toward each of first and second side walls 80, 82, between each shelf 84. These diverging fins 102 may help to divert the exhaust flow away from a center of mixer 76 and towards a center of each leg of shelf 84.

Industrial Applicability

The mixers of the present disclosure may be applicable to any liquid/gas mixing operation, where efficient, even, and thorough mixing is desired. The disclosed mixers may be particularly applicable to reductant/exhaust gas mixing operations for use with engine systems having downstream catalyst substrates.

Several advantages may be associated with the disclosed mixers. For example, the disclosed mixers may inhibit injected reductant from spraying against a cool wall of an associated exhaust duct. This may reduce condensation of the reductant, reduce premature wear of the duct, reduce deposit formation, reduce fowling of the associated injector, and promote efficient use of the reductant. In addition, the turbulent flows generated in the exhaust by the disclosed mixers may improve reductant/exhaust mixing. Further, the disclosed mixer embodiments may be intended for use with a single reductant injector or multiple injectors, as desired.

It will be apparent to those skilled in the art that various modifications and variations can be made to the mixers of the present disclosure without departing from the scope of the disclosure. Other embodiments will be apparent to those skilled in the art from consideration of the specification and practice of the mixers disclosed herein. It is intended that the specification and examples be considered as exemplary only, with a true scope of the disclosure being indicated by the following claims and their equivalents.

What is claimed is:

1. A mixer, comprising:
   an impingement floor located within an intended fluid injection path and generally parallel with a flow direction;
   a first side wall connected along a lengthwise edge of the impingement floor and generally parallel with the flow direction;
   a second side wall connected along an opposing lengthwise edge of the impingement floor and generally parallel with the flow direction; and
   at least one shelf extending between the first and second side walls and generally parallel with the flow direction, the at least one shelf having a plurality of vanes protruding toward and away from the impingement floor that promotes mixing of an injected fluid,
   wherein the impingement floor extends further upstream along the flow direction than the at least one shelf, and the plurality of vanes extend downstream from the at least one shelf with respect to the flow direction.

2. The mixer of claim 1, wherein each of the impingement floor, first side wall, and second side wall are generally flat and plate-like.

3. The mixer of claim 1, wherein each of the impingement floor, first side wall, and second side wall have a plurality of converging fins that promote inward movement of the injected fluid.

4. The mixer of claim 3, wherein the plurality of converging fins are connected to each of the impingement floor, first side wall, and second side wall at leading edges and protrude inward at trailing edges.

5. The mixer of claim 1, wherein the at least one shelf includes a plurality of substantially identical shelves spaced apart at generally equal distances from the impingement floor.

6. The mixer of claim 5, wherein mixing fins of the plurality of substantially identical shelves are oriented in an alternatingly opposite configuration.

7. The mixer of claim 1, wherein the impingement floor extends a greater distance than the first and second side walls.

8. The mixer of claim 7, wherein the impingement floor is about twice as long in the flow direction as the first and second side walls.

9. The mixer of claim 1, wherein each of the impingement floor, first side wall, and second side wall have tabs configured to engage an internal cylindrical surface of an associated passage.

10. The mixer of claim 9, wherein a velocity of fluid passing between the internal cylindrical surface of the associated passage and each of the impingement floor, first side wall, and second side wall is substantially higher than a velocity of fluid passing between the impingement floor, first side wall, and second side wall.

11. The mixer of claim 1, wherein the plurality of vanes is configured to generate a turbulent mixing of injected fluid with a flow of exhaust gas.

12. The mixer of claim 1, wherein the plurality of vanes extend from a trailing edge of the at least one shelf.

13. The mixer of claim 12, wherein the at least one shelf further includes:
   a generally flat face;
   at least one opening formed in the generally flat face; and
   a fin extending from a leading edge of the at least one opening at an angle relative to the intended injection direction.

14. The mixer of claim 1, wherein the at least one shelf includes tabs at opposing ends that are configured to be received within corresponding slots formed in the first and second side walls.

15. The mixer of claim 1, wherein the plurality of vanes are each oriented at an angle of about 40-50° relative to a flow direction through the mixer.

16. The mixer of claim 1, wherein the at least one shelf has a V-shape that is inverted relative to the impingement floor.

17. The mixer of claim 16, further including a center divider extending from the impingement floor through a vertex of the at least one shelf.

18. The mixer of claim 1, wherein the first and second side walls each form an internal obtuse angle with the impingement floor.

19. A mixer, comprising:
   a generally cylindrical tube;
   a generally flat impingement floor fixedly mounted within the cylindrical tube;
   a generally flat first side wall connected along one lengthwise edge of the impingement floor at an obtuse interior angle;
   a generally flat second side wall connected along an opposing lengthwise edge of the impingement floor at the obtuse interior angle;
   a plurality of shelves extending between the first and second side walls, each of the plurality of shelves having a generally inverted V-shape and a plurality of vanes; and
   a central divider located about midway between the first and second side walls and passing through a vertex portion of the plurality of shelves, the central divider having a plurality of diverging fins formed at a trailing edge that protrude in opposing directions toward the first and second side walls.

20. A fluid injection system, comprising:
a generally cylindrical exhaust duct;
at least one injector configured to inject reductant radially inward toward a center axis of the generally cylindrical duct; and
a mixer located at the at least one injector within the generally cylindrical duct, the mixer including:
a generally flat impingement floor located opposite the at least one injector within the generally cylindrical exhaust duct, the impingement floor extending generally parallel with an exhaust flow direction;
a generally flat first side wall connected along one lengthwise edge of the impingement floor and generally parallel with the exhaust flow direction;
a generally flat second side wall connected along an opposing edge of the impingement floor and generally parallel with the exhaust flow direction; and
a plurality of shelves extending between the first and second side walls at a trailing end of the impingement floor, the plurality of shelves being generally parallel with the exhaust flow direction and each having a plurality of vanes protruding alternatingly toward and away from the impingement floor to promote mixing of injected fluid with exhaust gas,
wherein each of the impingement floor, the first side wall, and the second side wall is welded to the generally cylindrical exhaust duct and has a plurality of converging fins that direct exhaust inward from a periphery of the generally cylindrical exhaust duct toward the plurality of shelves.

* * * * *